UNITED STATES PATENT OFFICE.

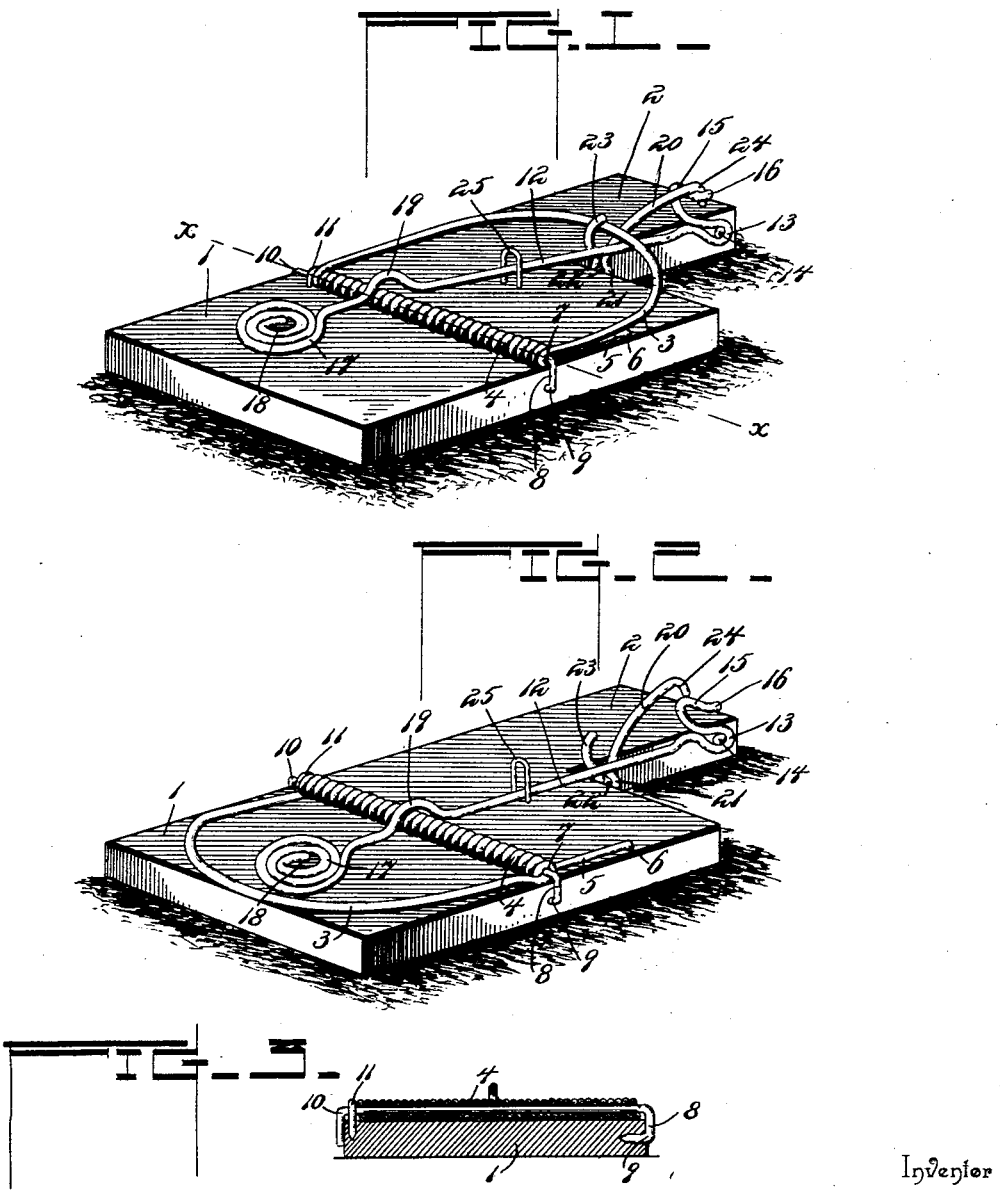

JOHN B. DAVIS, OF ABINGDON, ILLINOIS.

ANIMAL-TRAP.

SPECIFICATION forming part of Letters Patent No. 591,956, dated October 19, 1897.

Application filed January 9, 1897. Serial No. 618,614. (No model.)

*To all whom it may concern:*

Be it known that I, JOHN B. DAVIS, a citizen of the United States, residing at Abingdon, in the county of Knox and State of Illinois, have invented a new and useful Animal-Trap, of which the following is a specification.

This invention relates to animal-traps, its objects being to provide a trap for catching mice or rats, which will be very sensitive in its action and which may be set without endangering the hand of the person handling it.

With these ends in view my invention consists in the several details of construction and combination of parts hereinafter fully set forth, and particularly pointed out in the claims.

In the drawings, Figure 1 is a perspective view of my improved trap set. Fig. 2 is a similar view showing the trap sprung. Fig. 3 is a section on the line $x\,x$ of Fig. 1.

Similar reference-numerals indicate similar parts in the several figures.

1 represents the base-plate, preferably of wood and of any suitable size. As shown, the trap is halved out to leave one of its end portions about half the width of the remaining portion, as indicated at 2.

3 represents the spring-actuated jaw, which, as shown, is in the form of a loop, and 4 the transverse spring which actuates the jaw. The jaw and its spring are formed from a single piece of wire in the following manner: The wire is bent to form an arm 5, having a downwardly-turned end 6 adapted to be secured in the base. The wire is then coiled to form the transverse spring 4, and from the end of this coil the loop 3 leads out and is bent around to bring its other end in engagement with the opposite end of the coil, where it is bent to form an eye 7.

8 represents a piece of wire having at one end a return-bend 9, which is secured in the edge of the base-plate, and the wire 8 passes through the eye 7 and the coil-spring 4 and is preferably bent over on the opposite edge of the trap, as indicated at 10. In order to hold this last-named end down to the base-plate, a staple 11 is driven into the base to straddle the wire 7 at this point and thereby hold the spring 4 to the surface of the base.

12 represents the tripping-lever, consisting of a piece of wire bent at its outer portion to form a loop 13, by means of which it is pivoted on a pin 14, driven into the inner edge of the end portion 2 of the base-plate. The end of the wire is then bent upwardly and laterally at a slight angle to project over the base-plate when it is given a return-bend to form a horizontal part 15, which part is also preferably bent forwardly at a right angle, as indicated at 16. The opposite end of the lever is bent in the form of a horizontally-arranged coil, as indicated at 17, with an opening 18 in the center to form a receptacle for bait. The lever is provided with an upward bend, as indicated at 19, to fit over the transverse spring 4, in order that the lever may rest on the surface of the trap when the latter is sprung.

20 represents the trigger and consists of a piece of wire bent intermediate of its ends to form a loop 21 by means of which it is pivoted on a pin 22, inserted in the edge of the base-plate. One of the ends of the wire, from which the trigger is made, is curved as indicated at 23 to form a hook to receive and hold the spring-actuated jaw 3 when the trap is set, as indicated in Fig. 1, and the other end is also bent into the form of a hook, as indicated at 24, to engage the horizontal part 15 of the trigger when the trap is set.

25 indicates a staple which is driven into the base-plate to straddle the lever about midway of its length, and its object is to prevent the lever from being displaced laterally.

To set the trap, the spring-jaw 3 is pulled over until it engages with the hook 23 of the trigger, and the hook 24 may be made to engage with the horizontal part 15 of the lever, either by inverting the trap to cause the bait end of the lever to drop, and thereby cause the horizontal part 15 to tilt forward into engagement with the hook 24, or by lifting the lever by pushing on it with one finger near its pivot, which will have the same effect. In this manner the trap may be set without danger to the hand of the person handling it, even should the spring-jaw accidentally be thrown back. It is also apparent that by pivoting the lever, as shown and described, a very great leverage is obtained and that the slightest touch on the lever will be sufficient to spring the trap. By coiling the end of the lever in the manner shown, it forms a very convenient bait-holder and at the same time gives additional weight to this end of the lever, and thereby makes it much more sensitive to any extraneous force which may be applied to it. Bait of a pasty nature may be rubbed in between the coils of the wire to fill the spaces between them, thus avoiding the frequent renewal of the bait and preventing the possibility of its removal by the animal without tripping the lever and springing the trap.

By having the trigger pivoted at the front end of the trap and engaging it with the tripping-lever in advance of the jaw when set, none of the working parts will be moved in the path of travel of the jaw and consequently there will be nothing to obstruct its action. If, therefore, a mouse or rat should touch the lever in advance of the spring and within the jaw, the latter, when released, will roll the animal over and catch it on the other side of the spring. The trap will, therefore, be effective if the animal touches the lever anywhere in its length within the arc of travel of the jaw.

Instead of a wooden base a metal base may be employed, and in such event holes could be drilled wherever necessary for the reception of the pivot-pins, staples, &c.

It will be understood that changes in the form, proportion, and minor details of construction may be resorted to without departing from the spirit or sacrificing any of the advantages of this invention.

Having thus described my invention, what I claim is—

1. In an animal-trap, the combination with the base-plate and the spring-actuated jaw pivoted thereon, of a tripping-lever pivoted to the front end of the trap and extending rearwardly beyond the pivotal connection of the jaw to the base, and a trigger pivoted intermediate its ends to the base at a point between the pivotal points of connection between the base and the jaw and the base and the lever, one end of said trigger being adapted to engage the jaw and the other the forward end of the lever, substantially as described.

2. In an animal-trap, the combination of a base having one of its end portions halved out or reduced in width, a coiled spring extending transversely of the base and secured thereto, a jaw actuated by the spring, a tripping-lever pivoted at its front end portion to the inner side edge of the reduced end of the base and extending rearwardly over the spring, said lever having an upward bend to fit over the spring, and a trigger pivoted intermediate its ends to the inner side edge of the reduced end of the base in rear of the pivot of the tripping-lever, one end of the trigger being adapted to engage the end of the tripping-lever and its other end to engage the said jaw, substantially as described.

3. In an animal-trap, the combination with the base, a coiled spring extending transversely of the base and secured thereto, and a jaw actuated by the spring, of a tripping-lever pivoted to the frame in advance of the spring and extending rearwardly over the spring, said lever having an upward bend to fit over the spring, and a trigger pivoted intermediate its ends to the base, one end of said trigger being adapted to engage the forward end of the lever and the other end to engage the jaw, substantially as described.

4. In an animal-trap, the combination with the base, of a coiled spring extending transversely thereof, a jaw actuated by said spring, a rod extending through the spring and having at one of its ends a return-bend secured in the edge of the base, and a staple secured in the base to hold the opposite end of the rod to the base, substantially as described.

In testimony that I claim the foregoing as my own I have hereto affixed my signature in the presence of two witnesses.

JOHN B. DAVIS.

Witnesses:
FRANKLIN P. ROUSE,
SAMUEL T. MOSSER.